US008483206B2

(12) United States Patent
Kohli et al.

(10) Patent No.: US 8,483,206 B2
(45) Date of Patent: Jul. 9, 2013

(54) METHOD AND SYSTEM FOR PROVIDING A MULTIMEDIA CALL MODEL

(75) Inventors: Pardeep Kohli, Plano, TX (US); Jianming Xu, Plano, TX (US); Ghassan Naim, Garland, TX (US); Sheshagiri R. Madhavapeddy, Richardson, TX (US)

(73) Assignee: Alcatel Lucent, Paris (FR)

( * ) Notice: Subject to any disclaimer, the term of this patent is extended or adjusted under 35 U.S.C. 154(b) by 992 days.

(21) Appl. No.: 10/495,008

(22) PCT Filed: Nov. 15, 2002

(86) PCT No.: PCT/US02/36532
§ 371 (c)(1),
(2), (4) Date: May 10, 2004

(87) PCT Pub. No.: WO03/044628
PCT Pub. Date: May 30, 2003

(65) Prior Publication Data
US 2004/0240427 A1    Dec. 2, 2004

Related U.S. Application Data

(60) Provisional application No. 60/333,824, filed on Nov. 16, 2001.

(51) Int. Cl.
*H04L 12/28* (2006.01)
(52) U.S. Cl.
USPC ............. 370/351; 370/395.2; 370/395.21

(58) Field of Classification Search
USPC ............. 370/352–356, 465, 466, 522, 351, 370/395.2, 395.21
See application file for complete search history.

(56) References Cited

U.S. PATENT DOCUMENTS

| | | | |
|---|---|---|---|
| 6,023,474 A | 2/2000 | Gardner et al. | |
| 6,304,576 B1 | 10/2001 | Corley et al. | |
| 6,360,265 B1 | 3/2002 | Falck et al. | |
| 6,404,873 B1 * | 6/2002 | Beyda et al. | 379/202.01 |
| 6,430,176 B1 * | 8/2002 | Christie, IV | 370/355 |
| 6,449,284 B1 | 9/2002 | Hagirahim | |
| 6,950,441 B1 * | 9/2005 | Kaczmarczyk et al. | 370/467 |
| 6,967,933 B2 * | 11/2005 | Chapuran et al. | 370/271 |
| 6,996,076 B1 * | 2/2006 | Forbes et al. | 370/310 |
| 7,162,024 B2 * | 1/2007 | Wah et al. | 379/229 |
| 7,180,889 B1 * | 2/2007 | Kung et al. | 370/352 |
| 7,218,626 B2 * | 5/2007 | Shaheen et al. | 370/338 |
| 2002/0093948 A1 * | 7/2002 | Dertz et al. | 370/355 |
| 2003/0012150 A1 * | 1/2003 | Chapuran et al. | 370/271 |
| 2003/0063590 A1 * | 4/2003 | Mohan et al. | 370/338 |

* cited by examiner

*Primary Examiner* — Dang Ton
*Assistant Examiner* — Brian O Connor
(74) *Attorney, Agent, or Firm* — RGIP LLC

(57) ABSTRACT

A multimedia call model is provided to handle, maintain and control multimedia calls and their interactions in a network entity (100) for an end-user in the network. The call model provides a first Call Control Process (CCP) (102) having a first media service type and associated with a first group of agents (104, 106), and a second CCP (112) having a second media service type and associated with a second group of agents (114, 116, 118, 124, 126, 128). The call model also provides a Multimedia Call Process (MMCP) (150) for facilitating the arrangement and/or communication between the two CCPs.

13 Claims, 3 Drawing Sheets

METHOD AND SYSTEM FOR PROVIDING A MULTIMEDIA CALL MODEL

BACKGROUND OF THE INVENTION

This application claims the benefit of U.S. Ser. No. 60/333,824 filed Nov. 16, 2001, and which is hereby incorporated by reference.

The present disclosure relates generally to voice and data communications, and more particularly, to multimedia call modeling in a telecommunication network entity.

In a given telecommunication network entity, a call model is implemented in order to establish, manage and keep track of call activities for a given end-user in the network. The call model is usually a software model implemented in the network entity. The call model activities change based on the activities of the end-user such as initiating a call, putting the call on hold, hanging-up the call and other actions.

Many standard call models exist today to manage calls and the interaction of call related services such as rrU CS-1, CS-2, AIN0.1 and AIN0.2. These call models are very popular in the fixed line network entities such as Public Switch Telephone Network (PSTN) switches. The Cellular Telecommunications Industry Association (CTIA) extends the fixed line call models to cover Wireless Intelligent Network (WIN) including the mobility call model. These call models are mainly used for voice based applications.

SUMMARY OF THE INVENTION

The present disclosure introduces a method and system to provide a call model to handle, maintain and control multimedia calls in a network entity for an end-user in the network. Also, the present disclosure presents a method for interaction between different models in a multimedia call model system.

In one example, a multimedia call model provides a first Call Control Process (CCP) having a first media service type, wherein the first CCP is associated with a first group of agents, and a second CCP having a second media service type, wherein the second CCP is associated with a second group of agents. The call model handles a multimedia service request between at least one of the first group of agents with at least one of the second group of agents by a Multimedia Call Process (MMCP), wherein the MMCP coordinates with the first CCP and the second CCP for providing the multimedia service.

The present disclosure introduces a minimum amount of delay in multimedia services call setup and provides a robust call state machine for high multimedia services performance. The present disclosure also allows fast introduction of multimedia Intelligent Networks services.

Moreover, the present disclosure provides a multimedia call model solution with a high scalability factor that allows the call model to support in a single call session any number of users as in conferencing and multi-party calls, any number of tele-service call and any tele-service call type. Additionally, the present disclosure provides a multimedia call model solution with a centralized control processor where a single Multimedia Call Control Process manages many Call Control Processes.

Also, the present disclosure provides a multimedia call model with a high flexibility factor that allows a single agent in a CCP of the call model to be characterized by one of many criteria. Also, the flexibility of the model allows any criteria to be used to characterize an agent in the CCP. Moreover, the present disclosure provides a multimedia call model solution that provides a high service quality that introduces very low delay in managing different tele-services types and different call connections for different users during the same call session.

DESCRIPTION OF THE PREFERRED EMBODIMENT

For the purposes of illustrating the present disclosure, various acronyms are used, the definitions of which are listed below:
CCP Call Control Process
IP Internet Protocol
PSTN Public Switch Telephone Network
QoS Quality of Service
TCP/IP Transmission Control Protocol/Internet Protocol The present disclosure is described below with several examples. It is understood, however, that the examples are not necessarily limitations to the present disclosure, but are used to describe embodiments of operation.

Figure 1:
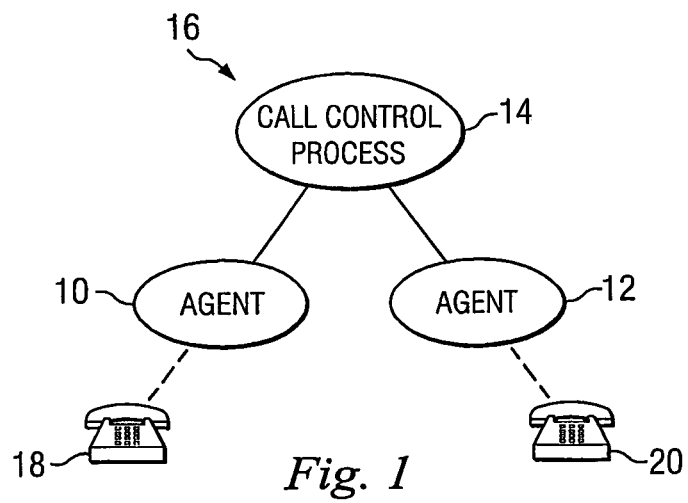
FIG. 1 illustrates a traditional call model composed of two agents and one call control process.

FIG. 1 illustrates the traditional call model concept using two agents 10, 12 and one Call Control Process (CCP) 14 available in a communications network entity 16. Agents can be processes or modules that are used to facilitate communication in a network over a desired protocol. The agent 10 can be designated, for the sake of example, as the originating agent and the agent 12 can be designated as the termination agent. When a call originator 18 attempts to complete a call to a destination 20, a request comes to a node in the communications network. The node can be a switch, a gateway, or any other network element suitable to perform this task. The node then starts the CCP 14 for serving the call request. The CCP 14 then creates an originating Agent and a terminating Agent based on the information received in the call request from the call originator 18. Creating an Agent includes, for instance, identifying the agent type, the protocol it supports and other required criteria. The CCP 14 activates the originating agent 10 to serve the originator 18 in the originator's required protocol, e.g., SS7 ISUP. The CCP 14 also activates the terminating agent 12 to serve the destination 20 in their required protocol, e.g., also SS7 ISUP. After the originating and termination agents are created, the CCP 14 links both agents and the call trio model is created.

Each agent consists of different states depending on the location of the call origination, location of the call termination and the media service type requested. As an example, the originating agent consists of the states as presented in FIG. 2. The present example starts with the originating agent 10 in a disconnect state 40. When activated, the agent 10 enters an active state 42 and waits for an answer to the call (state 44). The call proceeds at state 46 and call setup is authorized at state 48. A route is selected at state 50, information is analyzed at step 52, and the origination attempt is authorized at state 54. At any time, an exception 56 can occur and the state returns to a NULL state 58, in other words the call setup procedure is aborted.

Figure 3:
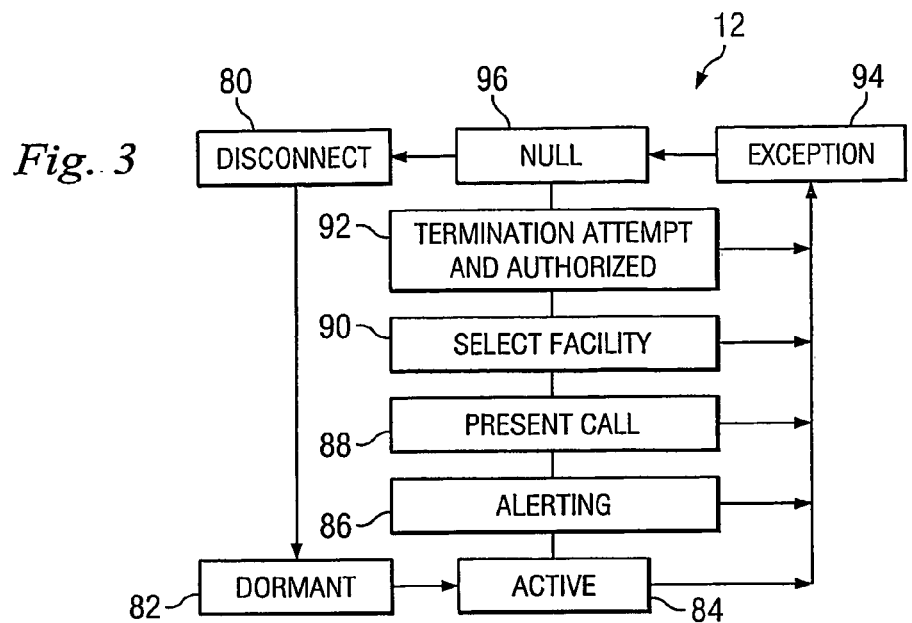
FIG. 3 illustrates a state diagram for a circuit terminating agent.

FIG. 3 provides an example of another set of states for the terminating agent 12. The present example start with the terminating agent 12 in a disconnect state 80 and a dormant state 82. When activated, the agent 12 enters an active state 84, then an alerting state 86 and a present call state 88. A facility is then selected at state 90 and a termination attempt is authorized at state 92. At any time, an exception 94 can occur and the state returns to a NULL state 96.

With the introduction of packet data services in the wireless and wireline environment, especially multimedia services, there is need to have a call model to effectively manage multimedia calls, the interactions of multimedia services and the associated Intelligent Network (IN) services. The complexity in multimedia call models arises from the fact that the same call model must be able to handle more than one call media type for the same end user in the network Multimedia services allow the end-user to communicate with another peer using more than one media type in the same session without terminating any call. For instance, a voice call can be conducted simultaneously with a data call such as a file transfer or even video conferencing. Also, the service allows adding additional calls of different media types to the same session. Current call models require each call to be associated with two agents: the originating agent and the terminating agent. Each agent has its associated states and Points In Call (SIC) or Detection Point such as Trigger Detection Point or Event Detection Point. Oftentimes in multimedia calls, an agent is required to change its call type in the middle of a call. For example, a SIP agent sometimes must change its voice call to a packet data call. With current call models, the new packet data call is required to go through unnecessary call origination and set-up procedures such as authorization and routing. Existing call models are not capable of handling this interaction. There is no known multimedia call model that can handle multimedia calls. Thus far, the AIN0.1, AIN0.2, ITU CS-1 and rTU CS-2 are commonly used and CTIA WIN is on-going to address wire-line and wireless IN applications.

What is needed is a multimedia call model that effectively manages calls of different medias for the same user during the same telecommunication session. The multimedia call model should be able to handle all media types that are available today for an end-user and should be able to handle future services and media types that are not currently available. The model should also be easily implemented into software. In addition, the model should be scalable in order to handle a multitude of different media types for the same user and support a large number of users in a given network entity. The model should work with existing call models that are implemented in other network entities that do not support multimedia services.

Figure 4:
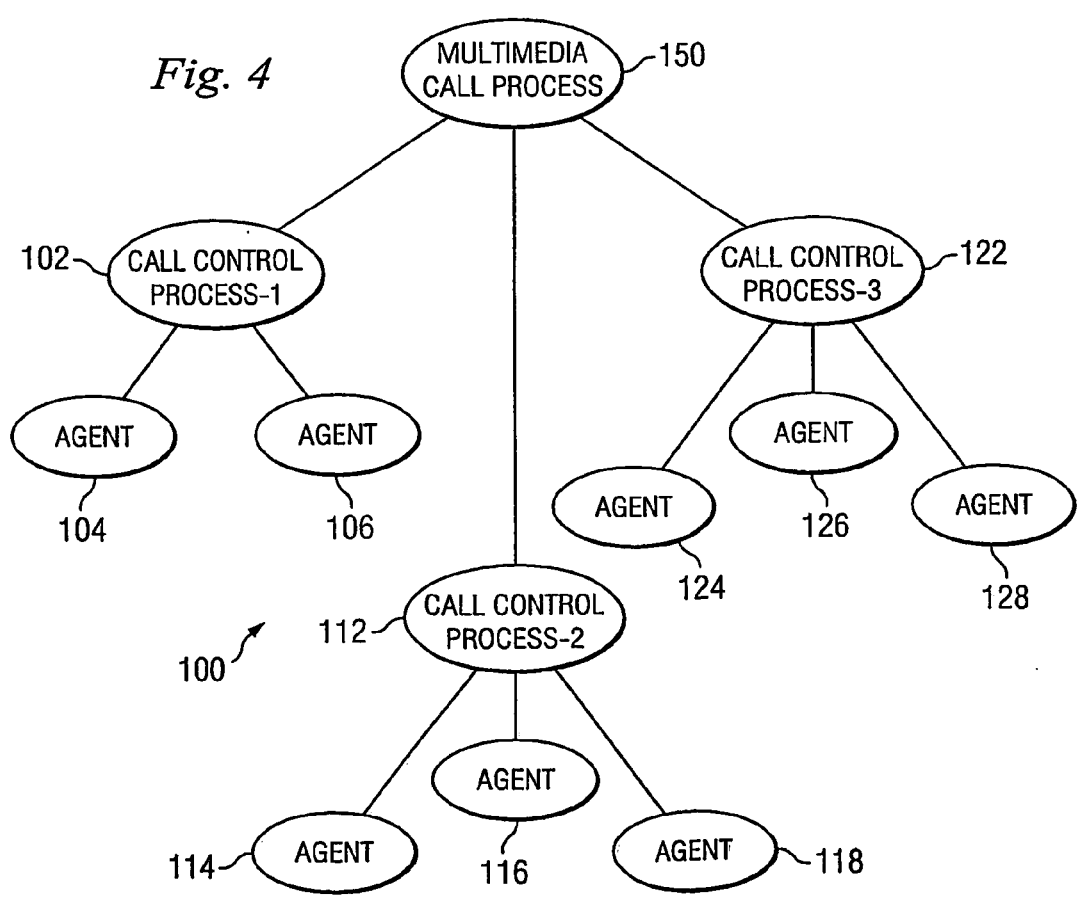
FIG. 4 illustrates a multimedia call model system according to one embodiment of the present invention.

FIG. 4 illustrates one embodiment of a multimedia call model system 100. The call model system 100 can be implemented in one or more different nodes of any type of network, including MSC and GSN nodes in a wireless network, STP and SCP nodes in the SS7 network, and/or server and client nodes in an 1P network. For the sake of example, the call model system 100 is implemented, along with the CCPs and agents, in a single node connected between the PSTN, the Internet, and several wireless voice/data networks.

In this example, each call is associated with two or more agents and a CCP. Also, each agent is characterized with agent states and Service Data Protocol (SDP) where call control signaling protocol, the requested service profile, the agreed QoS and media protocol are included. In furtherance of the example, CCP 102 is a call with an ISUP agent 104 as the originating agent and a SIP voice agent 106 as the terminating agent. The CCP 102 is responsible for harmonizing the signaling protocol, bearer and tele-service capabilities among all involved agents. The CCP 102 manages the service negotiation, connection setup, status and tearing-down operations for the basic call. Once all involved agents agree on the service capabilities and the required Quality of Service (QoS), the agents can be interconnected.

Similarly, CCP 112 is a call with agents 114, 116, 118, and CCP 122 is a call with agents 124, 126, and 128. The CCPs 112, 122 are responsible for harmonizing the signaling protocol, bearer and tele-service capabilities among their associated agents involved in the call. The CCPs 112, 122 manage the service negotiation, connection setup, status and tearing-down operations for the basic calls. Once all involved agents agree on the service capabilities and the required Quality of Service (QoS), the agents can be interconnected.

In multimedia applications, the bearer, comprising the user data traffic and tele-service capabilities as well as the negotiated QoS agreed upon during the call setup, may oftentimes change.

Whenever there is a change of the agreed service and QoS, new harmonization among involved agents and calls may be initiated and consensus should be reached. This consensus is achieved via the Multimedia Call Process (MMCP) 150. Like the CCPs 102, 112, and 122 in a call, the MMCP 150 coordinates and controls the multimedia call among various CCPs. Each CCP is able to have one media service type such as voice service or packet data service at a certain QoS. MMCP 150 also handles the service negotiation and inter-basic call interactions among two or more basic calls. The MMCP 150 manages multimedia service, the basic call setup, status and tearing-down operation of basic calls. When a change of QoS is requested from an involved party, a new basic call is created by the MMCP 150. Furthermore, new QoS is negotiated among the involved parties. The previous call may be removed by the MMCP 150.

To further describe the present embodiment, an example of a multimedia call can be described using the modules of FIG. 4. In this example, agent 104 initiates a voice call to agent 106 using the TDM media. In this example, the TDM media is controlled and managed by CCP 102. If agent 104 wants to have a data service with agent 116 who has been engaged with a call with agents 114 and 118, this service shall be controlled and managed by the MMCP 150. The MMCP 150 coordinates service capability of each involved agent and provides system resource allocation based on certain service provisioning criteria. Depending on the tele-service capability of agent 116, the data service can be set up with the coordination of CCP 102 and CCP 112.

Figure 5:
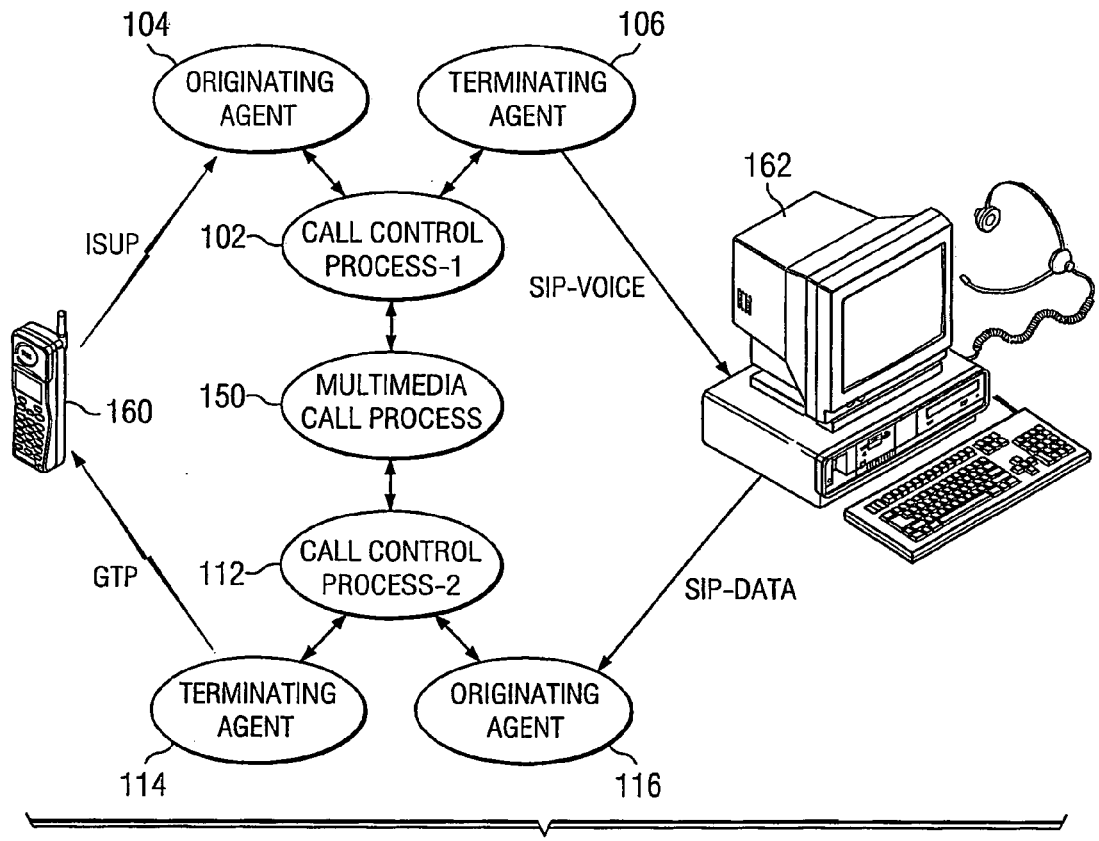
FIG. 5 illustrates a multimedia call model for concierge service.

FIG. 5 can be used to describe another example, utilizing a concierge service between two end-users in the network. The first end user can be a call originator with a standard GSM/GPRS Class B mobile terminal 160, and the second user can be a destination at a hotel or other facility with a SIP terminal 162 (illustrated as a computer with headphone and microphone). Although several communication protocols such as SIP, ISUP and GTP are mentioned in the illustration, it is understood that the details of these protocols are well known to those of ordinary skill in the art. In the concierge service example, the GSM/GPRS Class B mobile terminal 160 starts a telecommunication session with a basic voice call request with the SIP terminal 162. The call request is received by the network entity where the multimedia Call model is implemented. MMCP 150 receives the call request and, based on the call information included in the call request (e,g, calling number and called number), translates it into a call request from an ISUP end-point to a SIP end-point. MMCP 150 then creates CCP-1 102 and passes the call information to it. CCP-1 102 then creates an originating agent 104 of type ISUP and a terminating agent 106 of type SIP, and interconnects the two agents, hence creating a Voice-based call model that handles ISUP to SIP voice sessions During the voice connection, the mobile terminal 160 requests the concierge 162 for data information such as a list of directory services, a map, or pictures of a facility. The concierge 162 then initiates a data call to the mobile terminal 160. The data call is initiated in the SIP protocol for downloading the data applications by sending a SIP re-invite message.

Upon the arrival of the SIP re-invite message, the CCP-1 102 passes this message to the MMCP 150. The MMCP 150 then decides to create a new data call by creating CCP-2 112. Based on the service capability of the SIP concierge agent, the service provisioning and the mobile station capabilities, MMCP 150 determines if the terminating agent 106 (SIP-voice) or the originating agent 104 (ISUP-voice) should be kept alive. Since in the present example, the GSM/GPRS class B terminal 160 can only support one media type at a time, and given that the MMCP 150 is aware of this limitation, the MMCP 150 uses the necessary information from CCP-1 102 to create CCP-2 112. Once CCP-2 112 is created, MMCP 150 directs the elimination of CCP-1 102 along with the originating and terminating agents 104, 106.

After receiving all necessary information from MMCP 150, CCP-2 112 creates a SIP-ata originating agent 116 towards the SIP user-end, and a GTP-data terminating agent 114 towards the mobile station 160, then connects the two agents to form a SIP to GTP call session. Based on the service capability of the mobile terminal 160 and the associated service provisioning, the proper portion of resources are assigned with CCP-2 112 via the MMCP 150 and the QoS is negotiated with the originating agent 116 (SIP-data) for the completion of CCP-2 112.

During the SIP-to-GTP connection, the mobile station 160 can re-initiate the voice call with the same SIP end-user. When MMCP 150 receives this request, the CCP-1 102 creation is repeated and CCP-2 112 is eliminated. This due again to the fact the mobile class-B cannot support voice and data simultaneously during the same call session.

Figure 6:
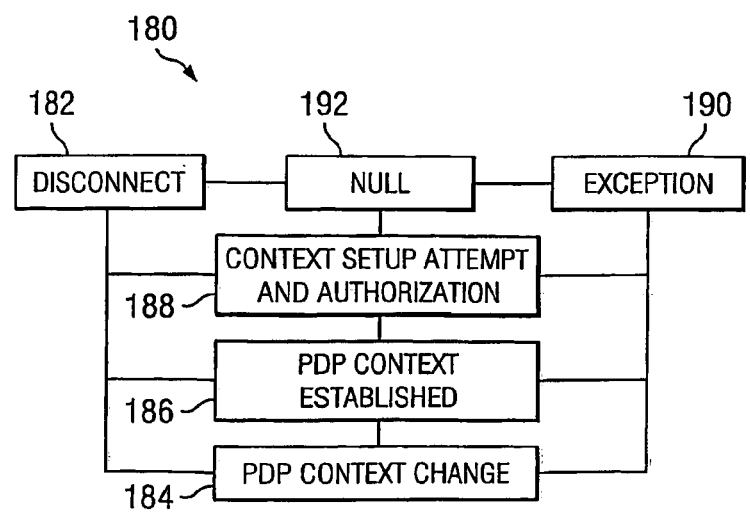
FIG. 6 illustrates state diagram for a GPRS data agent.

FIG. 6 presents a more detailed illustration of a state model 180 used by the GPRS agent in the example of FIG. 5. The GPRS agent states 180 are different from the circuit agent states presented in FIGS. 2 and 3. The states include a Disconnect stat 182, a PDP Context Change state 184, a PDP Context Established state 186, a Context Setup Attempt & Authorization state 188, an Exception state 190, and a NULL state 192. In the GPRS state agent model 180, the NULL state 192 is entered when the GPRS agent 114 is allocated from CCP-2 112. The Exception state 190 is entered when any GPRS exceptions occur during the handling of the GPRS call. An Exception handler routine may be performed before the agent 114 enters into the NULL state 192. In the Context Setup Attempt & Authorization state 184, setup attempt and authorization take place based on service provisioning and other subscriber related features. The PDP Context Established state 186 is entered after the PDP context has been established and a GTP tunnel has been successfully established. In this state 186, packet data can be sent from end-to-end. The Disconnect state 182 is entered when the GPRS agent is requested to remove its PDP context from GPRS MS or the network. A call feature such as prepaid and CAMEL services shall also be available at this state 182. The PDP Context Change state 184 is entered when the GPRS agent 114 is requested to change a serving SGSN. After successful change, the agent 114 enters into PDP Context Established state 186.

Figure 2:
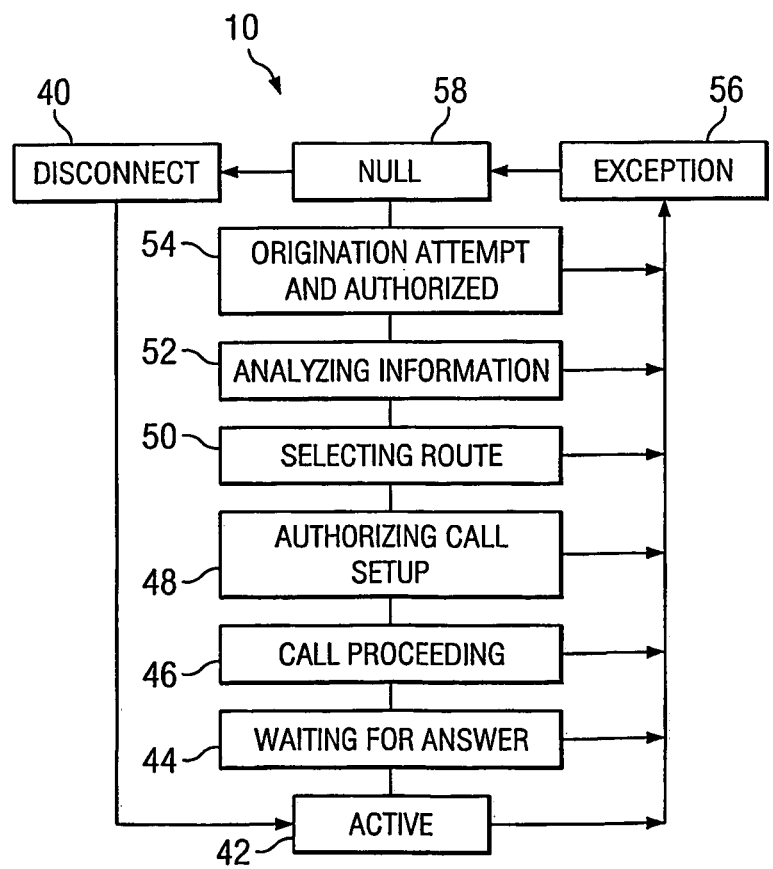
FIG. 2 illustrates a state diagram for a circuit originating agent.

In some embodiments, the SIP agent 116 can use the same call model as those for the circuit agents (FIGS. 2, 3).

If the mobile is a GSM/GPRS Class A that can handle simultaneous data and voice sessions during the same call session, MMCP 150 will not eliminate the CCP-1 102, but creates CCP-2 112 in parallel, and manages both calls of different media voice and Data at the same time during the same session. In this scenario, two CCPs 102, 112 co-exist and are running and managed at the same time by MMCP 150, and the mobile is receiving voice and data services during the same call session.

To keep proper track of call information for billing to the subscriber 104, an example is that one call detail record (CDR) is maintained per multimedia call (i.e. per MMCP). This CDR may be stored with the MMCP 150, or may be stored in a different node of the network. In the present embodiment, the CDR record comprises all voice CDR and data CDR, even if not every call is a multimedia call. Table 1, below, provides an example of a CDR.

TABLE 1

| CDR | Date | Media | Start Time | Length |
|---|---|---|---|---|
| 00003 | Nov. 7, 2001 | Voice | 14:23:10 | 10 minutes |
|  |  | Data | 14:32:08 | 5 minutes |
| 00004 | Nov. 9, 2001 | Voice | 08:10:09 | 2 minutes |

Another method to handle billing can also be to generate CRD for each media service that has happened in the MMCP. With this method, the Table 2, below, summarizes the CDR generation events.

TABLE 2

| CDR | Date | Media | Start Time | Length |
|---|---|---|---|---|
| 00003 | Nov. 7, 2001 | Voice | 14:23:10 | 10 minutes |
| 00004 | Nov. 11, 2001 | Data | 14:32:08 | 5 minutes |
| 00005 | Nov. 9, 2001 | Voice | 08:10:09 | 2 minutes |

The above disclosure provides many different example embodiments for implementing the disclosure. However, specific examples and processes are described herein to help clarify the disclosure. These are, of course, merely examples and are not intended to limit the disclosure from that described in the claims. For instance, even though the concierge service is used to describe the disclosure, the present disclosure also applies to any service or call that exists today and that will be available in the future. Also, even though voice and data media types were used as examples to describe the disclosure, the present disclosure also applies to any service type of any media. Additionally, even though a QoS level is used as one of the criteria to characterize an agent in the disclosure, the present disclosure also applies to a class of QoS to which multiple QoS levels belong. Additionally, even though 3 CCPs are used to describe the disclosure, the present disclosure applies to multiple CCPs managed by one MMCP. Furthermore, even though two end-users are used to describe the disclosure, the present disclosure also applies to multiple end-users that can engage in a single call session. In addition, even though two tele-service types are used to describe the disclosure, the present disclosure also applies to any number of tele-services as well as any number of media types that can be supported in a single call. Moreover, the present disclosure can be implemented in any network entity of a telecommunication entity. Also, even though multimedia services are used to describe the disclosure, the present disclosure also applies to any service that requires adding, removing and managing multiple calls of different types for the same end-user during a single telecommunication session.

The present disclosure as described above thus provides an economical and effective solution in defining a multimedia call model to handle, maintain and control multimedia calls and their interactions in a network entity for an end-user in the network.

In addition, the present disclosure introduces low delay in multimedia services call setup and provides a robust call state machine for high multimedia services performance. The present disclosure also allows fast introduction of multimedia Intelligent Networks services.

Moreover, the present disclosure provides a multimedia call model solution with a high scalability factor that allows the call model to support, in a single call session, any number of users as in conferencing and multi-party calls, any number of tele-service call and any tele-service call type. Additionally, the present disclosure provides a multimedia call model solution with a centralized control processor where a single Multimedia Call Control Process manages many Call Control Processes.

Also, the present disclosure provides a multimedia call model solution with a high flexibility factor that allows a single agent in a CCP of the call model to be characterized by one of many criteria. Also, the flexibility of the model allows any criteria to be used to characterize an agent in the CCP. Moreover, the present disclosure provides a multimedia call model solution that provides a high service quality that introduces very low delay in managing different tele-services types and different call connections for different users during the same call session.

It will also be understood by those having skill in the art that one or more (including all) of the elements/steps of the present disclosure may be implemented using software to develop the multimedia call model in a given network entity which will then be deployed in a telecommunication network at appropriate locations with the proper connections.

Furthermore, while the disclosure has been particularly shown and described with reference to the preferred embodiment thereof, it will be understood by those skilled in the art that various changes in form and detail may be made therein without departing from the spirit and scope of the disclosure, as set forth in the following claims.

What is claimed is:

1. A multimedia call model system, comprising:
    a Multimedia Call Process (MMCP) executable in a node of a communications network, the MMCP configured to:
        establish a first Call Control Process (CCP) having a first media service type, wherein the first CCP is associated with a first group of one or more agents, the first CCP linking a first unit and a second unit to communicate via the first media service type;
        receive a request from at least one of the first unit or the second unit for a service of a second media service type that is different from the first media service type, the request being received during the first media service type communication;
        establish a second CCP having the second media service type, wherein the second CCP is associated with a second group of one or more agents different from the first group of one or more agents, the second CCP linking the first unit and the second unit to communicate via the second media service type;
        determine if at least one of the first unit or the second unit can simultaneously support the first media service type and the second media service type; and
        eliminate the first CCP if at least one the first unit or the second unit does not simultaneously support the first media service type and the second media service type.

2. The multimedia call model system of claim 1 wherein the first and second CCPs harmonize signaling protocol, bearer and tele-service capabilities of the associated agents.

3. The multimedia call model system of claim 1 wherein the MMCP handles service negotiation and inter-basic interactions among two or more basic calls facilitated by the agents.

4. The multimedia call model system of claim 1 wherein the MMCP manages, basic call setup, status and tearing-down operation of basic calls.

5. A method for implementing a multimedia communication between an originating unit and a destination unit, comprising:
    establishing a first basic call linking the originating unit and the destination unit, the first basic call comprising a first call control process, a first originating agent and a first terminating agent, the first call control process controlling a first communication service of a first media service type between the first originating agent and the first terminating agent;
    identifying a change of service request for a second media service type that is different from the first media service type during a session of the first basic call of the first communication service of the first media service type; and
    establishing a second basic call in response to identifying the change of service, the second basic call linking the originating unit and the destination unit, the second basic call comprising a second call control process, a second originating agent and a second terminating agent different from the first originating agent and the first terminating agent, the second call control process controlling a second communication service of a second media service type different from the first media service type between the second originating agent and the second terminating agent;
    determining if at least one of the first unit or the second unit can simultaneously support the first media service type and the second media service type: and
    eliminating the first call control process if at least one the first unit or the second unit does not simultaneously support the first media service type and the second media service type.

6. The method of claim 5 wherein the first media service type comprises one of voice services and packet data services and the second media service type comprises the other of voice services and packet data.

7. The method of claim 5 wherein the multimedia call process handles service negotiation and inter-basic interactions among the first basic call and the second basic call.

8. The method of claim 5 wherein the multimedia call process manages basic call setup, status and tearing-down operation of basic calls.

9. A multimedia call model system for servicing a call between a first communication terminal and a second communication terminal, comprising:
    a node of a network, the node configured to provide a multimedia call process configured to:

establish a first basic call linking the first communication terminal and a second communication terminal, the first basic call comprising a first call control process, a first originating agent and a first terminating agent, the first call control process controlling a first communication service of a first media service type between the first originating agent and the first terminating agent;

identify a change of service request for a second media service type that is different from the first media service type during a session of the first basic call of the first communication service of the first media service type;

establish a second basic call linking the first communication terminal and a second communication terminal, the second basic call comprising a second call control process, a second originating agent and a second terminating agent different from the first originating agent and the first terminating agent, the second call control process controlling a second communication service of a second media service type different from the first media service type between the second originating agent and the second terminating agent;

determine if at least one of the first cummunication terminal or the second communication terminal can simultaneously support the first media service type and the second media service type; and eliminate the first basic call if at least one the first communication terminal or the second communication terminal does not simultaneously support the first media service type and the second media service type.

10. The system of claim 9 wherein the multimedia call process includes the capability to start and stop the first call control process in response to information from the second call control process.

11. The system of claim 10 wherein the multimedia call process is configured release the first call control process and direct a connection of the second call control process upon release of the first call control process.

12. The system of claim 9 wherein the multimedia call process is configured to establish a third basic call for serving the call by linking the first communication terminal with the second communication terminal.

13. The system of claim 9 wherein the multimedia control process includes instructions for maintaining a call detail record independent upon the protocol.

* * * * *